United States Patent
Haapanen

(10) Patent No.: US 11,444,830 B2
(45) Date of Patent: *Sep. 13, 2022

(54) MECHANISMS FOR CLOUD-BASED CONFIGURATION AND MANAGEMENT OF NETWORK DEVICES USING NETWORK MEDIATORS IMPLEMENTED SEPARATELY FROM THE NETWORK DEVICES

(71) Applicant: Tom Haapanen, Kitchener (CA)

(72) Inventor: Tom Haapanen, Kitchener (CA)

(73) Assignee: RICOH COMPANY, LTD., Tokyo (JP)

(*) Notice: Subject to any disclaimer, the term of this patent is extended or adjusted under 35 U.S.C. 154(b) by 78 days.

This patent is subject to a terminal disclaimer.

(21) Appl. No.: 15/903,818

(22) Filed: Feb. 23, 2018

(65) Prior Publication Data
US 2019/0268219 A1 Aug. 29, 2019

(51) Int. Cl.
*H04L 41/0803* (2022.01)
*H04L 41/0213* (2022.01)
(Continued)

(52) U.S. Cl.
CPC ...... *H04L 41/0803* (2013.01); *H04L 41/0213* (2013.01); *H04L 41/044* (2013.01);
(Continued)

(58) Field of Classification Search
CPC ............. H04L 41/0803; H04L 41/0213; H04L 41/0893
(Continued)

(56) References Cited

U.S. PATENT DOCUMENTS 6,167,445 A * 12/2000 Gai ...................... H04L 41/0893
709/220
6,941,374 B1 * 9/2005 Kronz ............... H04L 29/08846
709/227
(Continued)

FOREIGN PATENT DOCUMENTS

EP     1 768 306 A1    3/2007
JP    2004178553 A    6/2004
(Continued)

OTHER PUBLICATIONS

European Patent Office, "Search Report" in application No. 19 155 488.0-1216, dated Aug. 21, 2020, 6 pages.
(Continued)

*Primary Examiner* — Madhu Woolcock
(74) *Attorney, Agent, or Firm* — Hickman Becker Bingham Ledesma LLP; Malgorzata A. Kulczycka

(57) ABSTRACT

An improved method for configuring and managing network devices using network mediators is provided. The improved method comprises receiving, from a device management server, one or more policies for configuring or managing one or more network devices. For each policy from the one or more policies: a network mediator determines, based on the policy, a network device to which the policy applies. Then, based on the policy, the network mediator determines instructions for configuring or managing the network device, and transmits the instructions to the network device. Upon receiving, from the network device, a response to the instructions, the network mediator determines whether the response satisfies one or more conditions set forth in the policy. In response to determining that the response satisfies the conditions set forth in the policy, the network mediator generates a message based on the response, and transmits the message to the device management server.

20 Claims, 8 Drawing Sheets

(51) Int. Cl.
*H04L 41/044* (2022.01)
*H04L 41/0893* (2022.01)
*H04L 41/12* (2022.01)
*H04L 41/28* (2022.01)

(52) U.S. Cl.
CPC .......... *H04L 41/0893* (2013.01); *H04L 41/12* (2013.01); *H04L 41/28* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 8,161,162 | B1* | 4/2012 | Sutherland | H04L 41/0213 358/1.15 |
| 8,813,167 | B2* | 8/2014 | Mantere | G06F 9/44505 709/220 |
| 8,942,686 | B2* | 1/2015 | Wright | H04W 4/90 455/417 |
| 8,994,539 | B2 | 3/2015 | Grohman et al. | |
| 9,106,479 | B1* | 8/2015 | Mukerji | H04L 29/08072 |
| 10,200,842 | B1* | 2/2019 | Roy | H04L 67/16 |
| 10,555,357 | B1* | 2/2020 | Sharma | H04L 45/16 |
| 2002/0029278 | A1* | 3/2002 | Shiouchi | H04L 63/0823 709/229 |
| 2002/0129249 | A1* | 9/2002 | Maillard | H04N 7/1675 713/172 |
| 2003/0195957 | A1 | 10/2003 | Banginwar | |
| 2003/0200285 | A1* | 10/2003 | Hansen | H04L 41/0806 709/220 |
| 2004/0022258 | A1* | 2/2004 | Tsukada | H04L 63/0272 370/401 |
| 2004/0139188 | A1* | 7/2004 | Imai | H04L 41/0273 709/223 |
| 2004/0158632 | A1* | 8/2004 | Sasaki | H04L 12/2829 709/224 |
| 2004/0215760 | A1* | 10/2004 | Bergeot | H04L 41/0226 709/223 |
| 2004/0243994 | A1* | 12/2004 | Nasu | G06F 8/65 717/171 |
| 2005/0114397 | A1 | 5/2005 | Doshi et al. | |
| 2006/0077988 | A1 | 4/2006 | Cheng et al. | |
| 2006/0182042 | A1* | 8/2006 | Nasu | H04L 41/28 370/254 |
| 2008/0189774 | A1* | 8/2008 | Ansari | G06Q 30/04 726/7 |
| 2008/0222604 | A1* | 9/2008 | Murphy | G06F 8/61 717/120 |
| 2009/0048022 | A1* | 2/2009 | Iddings | G07F 17/323 463/42 |
| 2009/0248842 | A1* | 10/2009 | Hashimoto | H04L 41/0893 709/221 |
| 2010/0241738 | A1* | 9/2010 | Noguchi | H04L 67/125 709/220 |
| 2010/0313242 | A1* | 12/2010 | Sato | H04L 12/4641 726/3 |
| 2011/0252240 | A1* | 10/2011 | Freedman | H04L 63/02 713/169 |
| 2012/0047054 | A1* | 2/2012 | Vasinkevich | G06Q 40/00 705/35 |
| 2012/0136461 | A1* | 5/2012 | Satoh | H04Q 9/00 700/19 |
| 2012/0239821 | A1* | 9/2012 | Hozumi | H04L 67/125 709/238 |
| 2012/0278454 | A1 | 11/2012 | Stewart et al. | |
| 2012/0284506 | A1* | 11/2012 | Kravitz | G06Q 40/00 713/151 |
| 2013/0016628 | A1* | 1/2013 | Bertani | H04L 41/046 370/255 |
| 2013/0036216 | A1* | 2/2013 | Chakravarthy | H04L 41/069 709/224 |
| 2013/0070780 | A1* | 3/2013 | Hozumi | H04B 7/15542 370/437 |
| 2013/0204996 | A1* | 8/2013 | Takazawa | H04L 41/50 709/223 |
| 2013/0329047 | A1* | 12/2013 | Jankowski | H04W 4/029 348/158 |
| 2014/0228009 | A1* | 8/2014 | Chen | H04W 4/027 455/414.1 |
| 2014/0304700 | A1* | 10/2014 | Kim | G06F 8/65 717/173 |
| 2015/0019699 | A1* | 1/2015 | Postal | H04L 41/0681 709/221 |
| 2015/0067129 | A1* | 3/2015 | Hayashi | H04L 12/1827 709/223 |
| 2015/0106216 | A1* | 4/2015 | Kenderov | G06Q 20/409 705/21 |
| 2016/0112339 | A1 | 4/2016 | Cheemalapati et al. | |
| 2016/0234186 | A1* | 8/2016 | Leblond | H04L 45/14 |
| 2017/0126664 | A1* | 5/2017 | Khandelwal | H04L 63/0823 |
| 2017/0223128 | A1* | 8/2017 | Shuvaev | H04W 88/06 |
| 2017/0286259 | A1* | 10/2017 | Watanabe | G06F 11/0751 |
| 2017/0289225 | A1* | 10/2017 | Snyder | H04L 47/12 |
| 2017/0344703 | A1* | 11/2017 | Ansari | H04L 67/2804 |
| 2018/0048773 | A1* | 2/2018 | Araki | H04N 1/00244 |
| 2018/0139694 | A1* | 5/2018 | Folke | H04W 40/125 |
| 2019/0268229 | A1 | 8/2019 | Haapanen | |
| 2020/0170075 | A1* | 5/2020 | Xu | H04W 88/04 |
| 2020/0244482 | A1* | 7/2020 | Sung | H04L 12/4633 |

FOREIGN PATENT DOCUMENTS

| | | |
|---|---|---|
| JP | 2013065223 A | 4/2013 |
| JP | 2017102941 A | 6/2017 |
| WO | WO 2017/117076 A1 | 7/2017 |

OTHER PUBLICATIONS

Haapanen, U.S. Appl. No. 15/903,829, filed Feb. 23, 2018, Office Action, dated Jun. 17, 2020.
Haapanen, U.S. Appl. No. 15/903,829, filed Feb. 23, 2018, Final Office Action, dated Dec. 28, 2020.
Haapanen, U.S. Appl. No. 15/903,829, filed Feb. 23, 2018, Final Rejection, dated Jan. 5, 2022.
Haapanen, U.S. Appl. No. 15/903,829, filed Feb. 23, 2018, Notice of Allowance and Fees Due, dated May 27, 2022.
Haapanen, U.S. Appl. No. 15/903,829, filed Feb. 23, 2018, Advisory Action, dated Mar. 21, 2022.

* cited by examiner

MECHANISMS FOR CLOUD-BASED CONFIGURATION AND MANAGEMENT OF NETWORK DEVICES USING NETWORK MEDIATORS IMPLEMENTED SEPARATELY FROM THE NETWORK DEVICES

TECHNICAL FIELD

The present invention relates to cloud-based mechanisms for configuring and managing network devices using network mediators. SUGGESTED GROUP ART UNIT: 2447; SUGGESTED CLASSIFICATION: 358.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Over the years, device management has become an essential tool for monitoring and managing network devices such as printers, scanners, and multifunctional peripheral devices. Typically, a central manager manages the network devices by sending Simple Network Management Protocol (SNMP) requests to the devices. The devices usually execute software program applications called SNMP agents, and the agents provide SNMP responses to the SNMP requests received from the central manager.

SNMP agents executed on network devices are usually configured as passive agents. They can respond to queries received from a central manager, and provide to the manager status information and other information that the manager may request. However, the passive agents are unlikely to initiate a message exchange with the manager without being first asked by the manager to do so.

Even if more advanced communications protocols are used, the agents implemented in the network devices are still configured as passive agents. Hence, unless the managers request updates from the network devices, the agents executed on the network devices remain passive. As a result, modern network environments that implement the managers in public networks are unable to manage the network devices that are located in private or local networks because the managers are unable to communicate with the devices' private or local networks through the Internet-based firewalls.

Passive agents have been deeply embedded in communications networks for years, and changing the legacy architecture of the communications networks to implement for example, proactive agents could take years of development efforts. In fact, in some computer networks, replacing the passive agents in the network devices with the proactive agents may be virtually impossible.

SUMMARY

In an embodiment, a network device managing system for improving a process of configuring and managing network devices using network mediators is disclosed. The network device managing system comprises one or more network mediators and a device management server.

A network mediator may be configured as a standalone computer server, and may be configured to directly manage one or more network devices. A device management server may be configured to indirectly manage the network devices, and may be configured as another standalone computer server that is separate from the network mediator. The device management server may be separated from the network mediator by one or more communications firewalls. Examples of the network devices include multifunction peripheral devices, printers, scanners, fax machines, workstations, laptops, personal computers, personal digital assistants, and tablets.

In an embodiment, a network mediator acts as a proxy, and receives, from a device management server, one or more policies for configuring or managing one or more network devices. A policy for configuring a network device may include for example, configuration settings that are to be implemented on the device. A policy for managing a network device may include for example, a request to provide status information from the device. Furthermore, the policies may specify for example, an identification of a network device, a type of information that is requested from the network device, a type of information that is not to be reported from the network device to the device management server, a time schedule for polling information from the network device, one or more conditions for processing a response received from the network device, a format type of a message to be sent to the device management server, and/or a format type of instructions to be sent to the network device. The policies may be transmitted from the device management server to the mediator in HTTP messages, SOAP messages, or other application-level messages.

For each policy, a network mediator may determine, based on the policy, a network device to which the policy applies. Also based on the policy, the mediator may determine one or more instructions for configuring or managing the network device. Then, the mediator may transmit the instructions to the network device. The instructions transmitted to the network device may be SNMP messages.

Upon receiving, from the network device, a response to the instructions, the network mediator may determine whether the response satisfies one or more conditions set forth in the policy. The conditions set forth in the policy may specify for example, a type of information to report to the device management server, a timing for reporting information to the device management server, an aggregation scheme for presenting information to the device management server, and/or a format of reporting messages to be sent to the device management server. In response to determining that the response satisfies the conditions set forth in the policy, the mediator may generate a message based on the response, and transmit the message to the device management server.

In an embodiment, prior to receiving policies from a device management server, a network mediator sends an authentication request to the device management server to establish a secure communications connection between the mediator and the device management server. Upon receiving, from the device management server, a first answer to the authentication request, the mediator transmits authentication credentials to the device management server. Upon receiving a second answer from the device management server, the mediator determines, based on the second answer, whether the mediator is successfully authenticated to the device management server. If the mediator is successfully authenticated to the device management server, then the mediator requests the policies from the device management server.

In an embodiment, prior to transmitting instructions to a network device, a network mediator establishes a communications connection between the network mediator and the network device. Once the mediator establishes the communications connection with the network device, the mediator may use the connection to transmit the instructions to the network device, and to receive responses and messages from the network device.

In an embodiment, a network mediator is configured to receive one or more SNMP messages from a network device. The SNMP messages may comprise SNMP trap messages, alerts, warnings, and/or status reports. The mediator may analyze the SNMP messages to determine whether to report the SNMP messages to a device management server. If the mediator determines that the messages need to be reported, then the mediator may generate one or more reporting messages that include the SNMP messages, and may transmit the reporting messages to the device management server.

DETAILED DESCRIPTION

Figure 1:
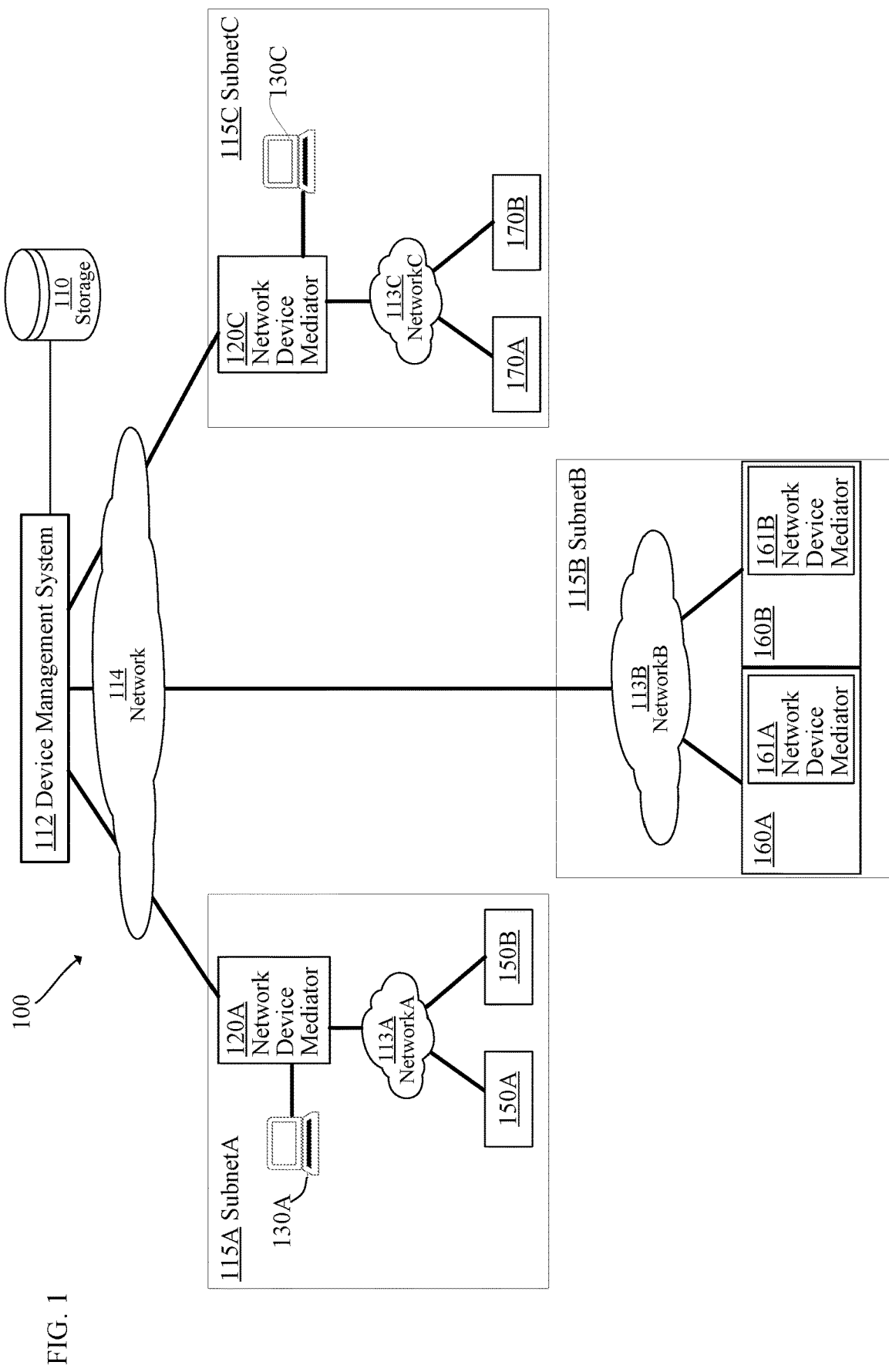
FIG. 1 is a block diagram that depicts an example architecture for configuring and managing network devices using network mediators.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

I. OVERVIEW
II. EXAMPLE ARCHITECTURE FOR CONFIGURING AND MANAGING NETWORK DEVICES USING NETWORK MEDIATORS
III. EXAMPLE ARCHITECTURE FOR CONFIGURING AND MANAGING NETWORK DEVICES USING NETWORK MEDIATORS CONFIGURED AS STANDALONE DEVICES
IV. NETWORK MEDIATORS
   A. EXAMPLE NETWORK MEDIATOR
   B. CONFIGURING A NETWORK MEDIATOR
   C. ESTABLISHING CONNECTIONS WITH A DEVICE MANAGEMENT SYSTEM
   D. AUTHENTICATING AND AUTHORIZING A MEDIATOR
   E. CONFIGURING AND MANAGING OUTPUT DEVICES
V. EXAMPLE ARCHITECTURE FOR CONFIGURING AND MANAGING NETWORK DEVICES USING NETWORK MEDIATORS EMBEDDED IN OUTPUT DEVICES
VI. EXAMPLE POLICIES FOR CONFIGURING AND MANAGING NETWORK DEVICES
VII. POLL-BASED MONITORING
VIII. PUSH-BASED MONITORING
IX. TRAPS
X. STATUS INFORMATION
XI. STATUS ALERTS
XII. DEVICE CONFIGURATION AND VALIDATION
XIII. EXAMPLE TIME CHART FOR CLOUD-BASED CONFIGURING AND MANAGING NETWORK DEVICES USING NETWORK MEDIATORS
XIV. EXAMPLE PROCESS FOR CLOUD-BASED CONFIGURING AND MANAGING USING NETWORK MEDIATORS
XV. IMPROVEMENTS PROVIDED BY CERTAIN EMBODIMENTS
XVI. IMPLEMENTATION MECHANISMS

I. Overview

In an embodiment, an improved method for configuring and managing output devices by implementing a device management system and network mediators is disclosed. Throughout the disclosure, the term "output device" is used interchangeably with the term network device. The output devices may include for example, multifunction peripheral devices, scanners, fax machines, copiers, printers, as well as desktops, laptops, personal computers, tables, personal device assistants, tablets, and the like.

A network mediator, also referred to herein as a mediator, may be a standalone computing device that is configured to communicate with a device management system and one or more output devices. If the mediator is implemented as a standalone computing device, then the mediator may manage one or more output devices, and the mediator may receive, from the device management system, policies for the one or more output devices.

A mediator may also be implemented as a computer program application executing on an output device, and may be configured to communicate with a device management system and with agents implemented in the output device. If the mediator is implemented as a program application, then each network device may execute its own mediator. Furthermore, if the mediator is implemented as a program application, then the policies that the mediator receives from the device management system are usually applicable only to the output device on which the mediator is executing.

Regardless of whether a mediator is implemented as a standalone computing device or as a computer program executing on an output device, the mediator is usually implemented as part of fabric of a local or private computer network. A local/private network may include one or more subnetworks. Subnetworks are referred to herein as subnets.

A computer network may include one or more subnets, and each subnet may include any combination of mediators. For example, a computer network may include only mediators that are implemented as standalone computing servers. Each of those mediators may manage one or more output devices. Another network may include only mediators that are implemented as computer program applications executing on individual output devices. Each of those mediators may manage the output device on which the mediator is executing. Other networks may include a combination of standalone mediators and a combination of mediators that are implemented as computer program applications executing on individual output devices. In those networks the mediators may be arranged in any ordered or non-ordered combinations. For example, some of the mediators may be arranged hierarchically, while others may be arranged linearly across the network.

In an embodiment, an improved method for configuring and managing output devices allows mediators to configure and manage output devices based on policies that are obtained for the output devices from a device management system. The improved approach allows configuring and managing the output devices without a need to redesign the communications protocols and computer program agents that already implemented in the output devices.

A device management system is a computer-based system that is configured to store, transmit and update policies for configuring and managing output devices. The device managements system may be implemented in a cloud-storage system, in any other Internet-based network, or in a computer server. If the device management system is implemented in a computer server, then it is referred to as a device management server.

A device management system may be separate from mediators and output devices residing in local and/or private computer networks. For example, the device management system may be separated from the mediators by one or more firewalls. In this situation, the device management system may be implemented on one side of the firewall, while the mediators and the output devices may be implemented on another side of the firewall.

In an embodiment, an improved method for configuring and managing output devices allows network mediators to establish communications connections with a device management system. The communications connections may be either secure communications connections or unsecure communications connections. For example, if a network mediator is implemented in a local computer network, and a device management system is implemented in a cloud-based device management system that is separated from the mediator by a firewall, then to communicate with the cloud-based device management system, the mediator may establish a secure communications connection with the device management system.

However, if a network mediator and a device management system are part of the same computer network, and the network mediator may communicate with the device management system without for example, authenticating to the device management system, then the mediator may establish an unsecure communications connection with the device management system.

In an embodiment, an improved method for configuring and managing output devices allows mediators to configure and manage the output devices according to policies that may be downloaded from a device management system. The device management system may be configured to generate the policies for configuring and managing the output devices, and to update the policies as the computer networks managed by the device management system are scaled up, downsized, and/or redefined.

If a mediator is configured as a standalone hardware device, then the mediator usually manages one or output devices. However, if a mediator is configured as a program application executing on an output device, then the mediator usually manages the output device on which the mediator is configured.

In an embodiment, a mediator is configured to establish a secure communications connection with a device management system, receive policies for configuring and managing one or more output devices, and generate, based on the policies, instructions for the agents implemented in the output devices. The mediator may communicate the instructions to the agents implemented in the network devices, request information from the output devices, collect the information from the devices, and transmit the information to the device management system.

In an embodiment, a mediator is configured to receive status information and updates from one or more output devices, and communicate the received information and updates to a device management server. The received information and the updates may include responses received from the output devices after the mediator queried the output devices. For example, the received information may include SNMP messages received in response to SNMP queries that the mediator generated based on policies received from the device management system, and sent to the devices. The received information may also include message traps, alerts, or warnings that the output devices sent to the mediator without being queried for the information.

II. Example Architecture for Configuring and Managing Network Devices Using Network Mediators FIG. 1 is a block diagram that depicts an example architecture 100 for configuring and managing network devices using network mediators. Example architecture 100 includes a device management system 112 that is configured to configure and manage output devices implemented in the architecture 100.

Device management system 112 may be implemented in any type of computing device. For example, it may be implemented as a computer server in a cloud storage system. It may also be implemented as a computer server in the Internet-based network. Furthermore, a device management system may be implemented in a computer server in a local or private network that is locally or privately managed by an organization or by a company.

Device management system 112 may be configured to communicate with one or more network subnets 115A, 115B, 115C via one or more communications networks 114. Although FIG. 1 depicts three subnets (115A, 115B, 115C), example architecture 100 may include fewer subnets or additional subnets not depicted in FIG. 1. Some subnets may be arranged hierarchically, other subnets may be arranged linearly, yet other subnets may be arranged as a combination of hierarchical and linear arrangements. Examples of output devices include multifunctional peripheral devices, printers, scanners, fax machines, as well as laptops, personal computers, workstations, personal digital assistants, tablets and so forth.

Device managements system 112 may also be configured to store and retrieve data from a storage device 110. Storage device 110 may be implemented as a local or external storage device, and may be configured to store one or more policies for output devices implemented in subnets 115A, 115B, 115C. Examples of the policies are described in FIG. 5.

Communications between device management system 112 and mediators may utilize communications protocols such HTTP or SOAP, while communications between the mediator and corresponding output devices may utilize communications protocols such as SNMP.

A subnet 115A/115B/115C is a computer network that is configured and managed by device management system 112. Subnets 115A, 115B, and 115C are usually separate computer networks, and have assigned separate identifiers, such as Internet Protocol (IP) addresses, domain names, subnet masks, and so forth. Subnets 115A, 115B, 115C may be configured in many different ways, and the example in FIG. 1 depicts one of many possible configurations.

In the configuration depicted in FIG. 1, subnet 115A includes a standalone network device mediator 120A, a local computer network 113A, and one or more output devices 150A, 150B. Subnet 115A may also include additional mediators and/or output devices. Mediator 120A may be a workstation, a laptop, a PC, a tablet, or other computing device. Mediator 120A may be configured with a separate input/out terminal 130A including a keyboard and a display screen.

Subnet 115B includes a local computer network 113B and one or more output devices 160A, 160B. In the depicted example, subnet 115B includes two output devices 160A 160B; however, other implementations may include fewer output devices or additional output devices. Output device 160A may include a network device mediator 161A, which is a computer program application installed and executing on output device 160A. Output device 160B may include a network device mediator 161B, which is a computer program application installed and executing on output device 160B.

Subnet 115C includes a standalone network device mediator 120C, a local computer network 113C, and one or more output devices 170A, 170B. Mediator 120C may be a workstation, a laptop, a PC, a tablet, or other computing devices. Mediator 120C may be configured with a separate input/output terminal 130C including a keyboard and a display screen.

Each of subnets 115A/115B/115C implements at least one network device mediator. In the example depicted in FIG. 1, subnet 115A implements standalone network device mediator 120A; subnet 115B implements one or more mediator computer program applications 161A, 161B, each embedded in an output device, respectively; and subnet 115C implements standalone network device mediator 120C.

Figure 2:
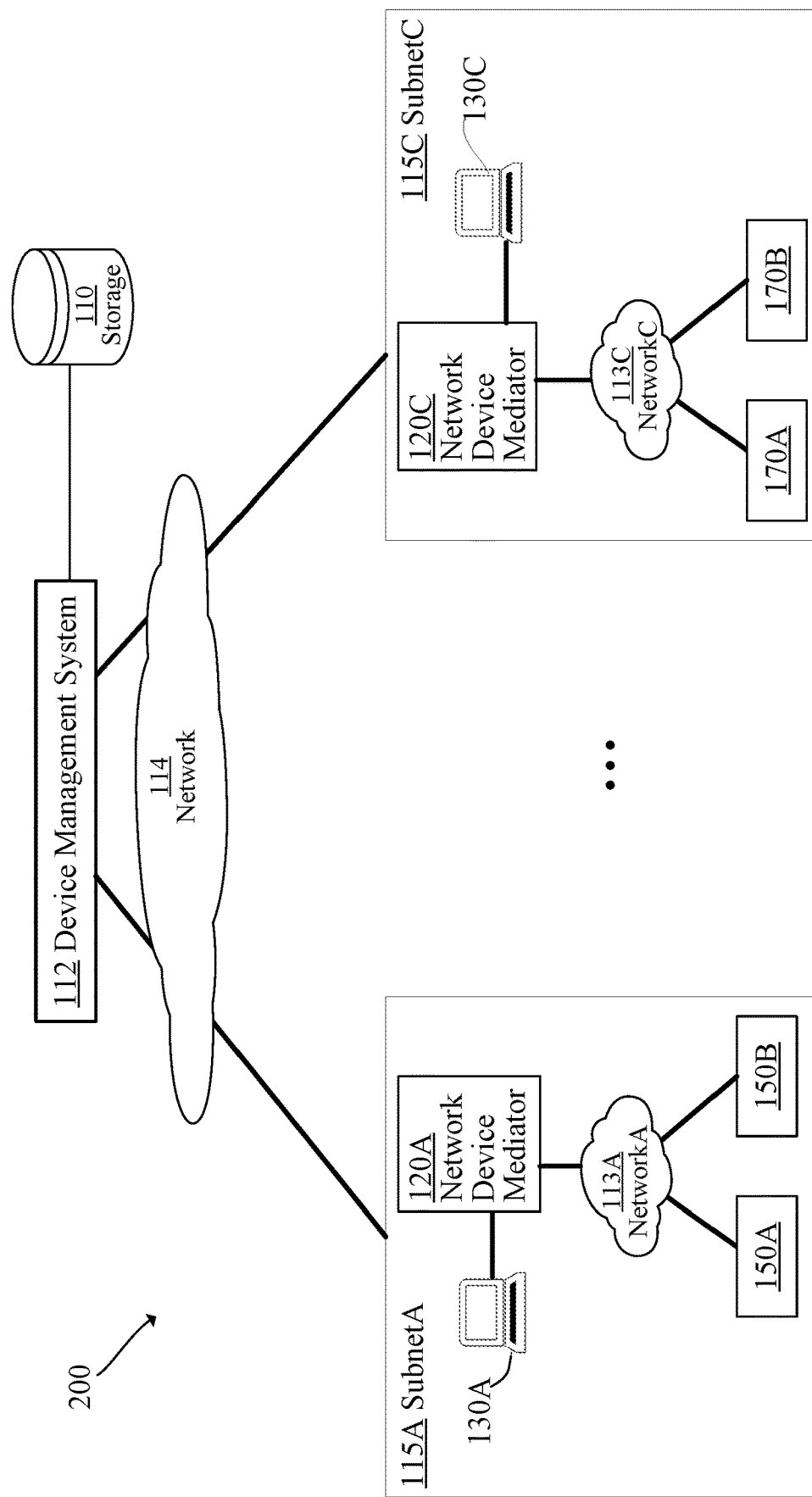
FIG. 2 is a block diagram that depicts an example architecture for configuring and managing network devices using network mediators configured as standalone devices.

III. Example Architecture for Configuring and Managing Network Devices Using Network Mediators Configured as Standalone Devices FIG. 2 is a block diagram that depicts an example architecture 200 for configuring and managing output devices using network mediators configured as standalone devices. Example architecture 200 includes device management system 112, one or more storage devices 110, one or more networks 114, and one or more subnets 115A, 115C. Although FIG. 2 depicts two subnets (115A, 115C), example architecture 200 may include fewer subnets or additional subnets not depicted in FIG. 2. Examples of output devices include multifunctional peripheral devices, printers, scanners, fax machines, as well as laptops, personal computers, workstations, personal digital assistants, tablets, and so forth.

In the depicted example, device management system 112 may be configured to communicate with subnets 115A, 115C via one or more communications networks 114. Furthermore, device management system 112 may be configured to store and provide one or more policies for configuring and managing output devices 150A-B in subnet 115A, and one or more policies for configuring and managing output devices 170A-B in subnet 115C.

Mediators 120A, 120C may be configured to manage output devices in the subnetworks of architecture 200, and may be implemented in any type of a computing device, such as workstations, mainframes, cloud-based servers, and the like.

Mediators 120A, 120C may be configured to communicate with device management server 112, request one or more policies for output devices in the corresponding subnets, generate queries based on the receive policies, transmit the queries to the corresponding output devices, receive responses to the queries from the output devices, and transmit the responses to device management system 112. For example, mediator 120A may be configured to communicate with device management system 112 and output devices 150A, 150B, while mediator 120C may be configured to communicate with device management system 112 and output devices 170A, 170B. Although FIG. 2 depicts that each of the subnets includes one mediator, each subnet may include more than one mediator. Furthermore, in some implementations (not depicted in FIG. 2), one mediator may serve two or more subnets.

Mediators 120A, 120C may be configured with corresponding operator consoles. For example, mediator 120A may be configured with an operator console 130A, while mediator 120C may be configured with an operator console 130C. The operator consoles may include input devices such as keyboards, and display devices such as computer monitors. The operator consoles may also be implemented in portable devices such as smartphones, tablets, and the like.

In the architecture 200, mediator 120A/120C may manage output devices according to policies received from device management system 112. This scheme is referred to as a polling scheme because it includes polling the policies from device management system 112, and responding to the requests from device management system 112 by polling information from the output devices and transmitting the polled information to device management system 112.

In a polling scheme, mediator 120A/120C polls policies from device management system 1120. The policies may specify the type of information that is to be provided from the output devices to device management system 112, the frequency with which the output devices are to be polled for the information, the way that the information that is to be presented to device management system 112, the manner for aggregating and restructuring the information to be provided to device management system 112, and so forth. For example, upon receiving the policies from device management system 112, mediator 120A/120C may use the policies to determine instructions for configuring and managing the respective output devices, and send the instructions to the output devices to request responses from the output devices. Upon receiving responses from the output devices, mediator 120A/120C may process the received responses by aggregating and restructuring the received responses, and transmitting the aggregated/restructured responses to device management system 112.

In the architecture 200, mediator 120A/120C may manage output devices independently from, or in addition to, policies received from device management system 112. This scheme is referred to as a push scheme because it includes pushing information collected from the output devices to device management system 112 even if device management system 112 has not requested the information.

In a push scheme, mediator 120A/120C may manage output devices according to policies and schedules that have been configured on mediator 120A/120C, but that were not provided by device management system 112. For example, mediator 120A/120C may be configured to receive SNMP traps from the output devices. An SNMP trap may include for example, an indication of an event occurring on a printer. When the event occurs on the printer, the printer reports the event to the mediator, and the mediator may report the event to device management system 112. The traps are described in detail later.

IV. Network Mediators

Figure 3:
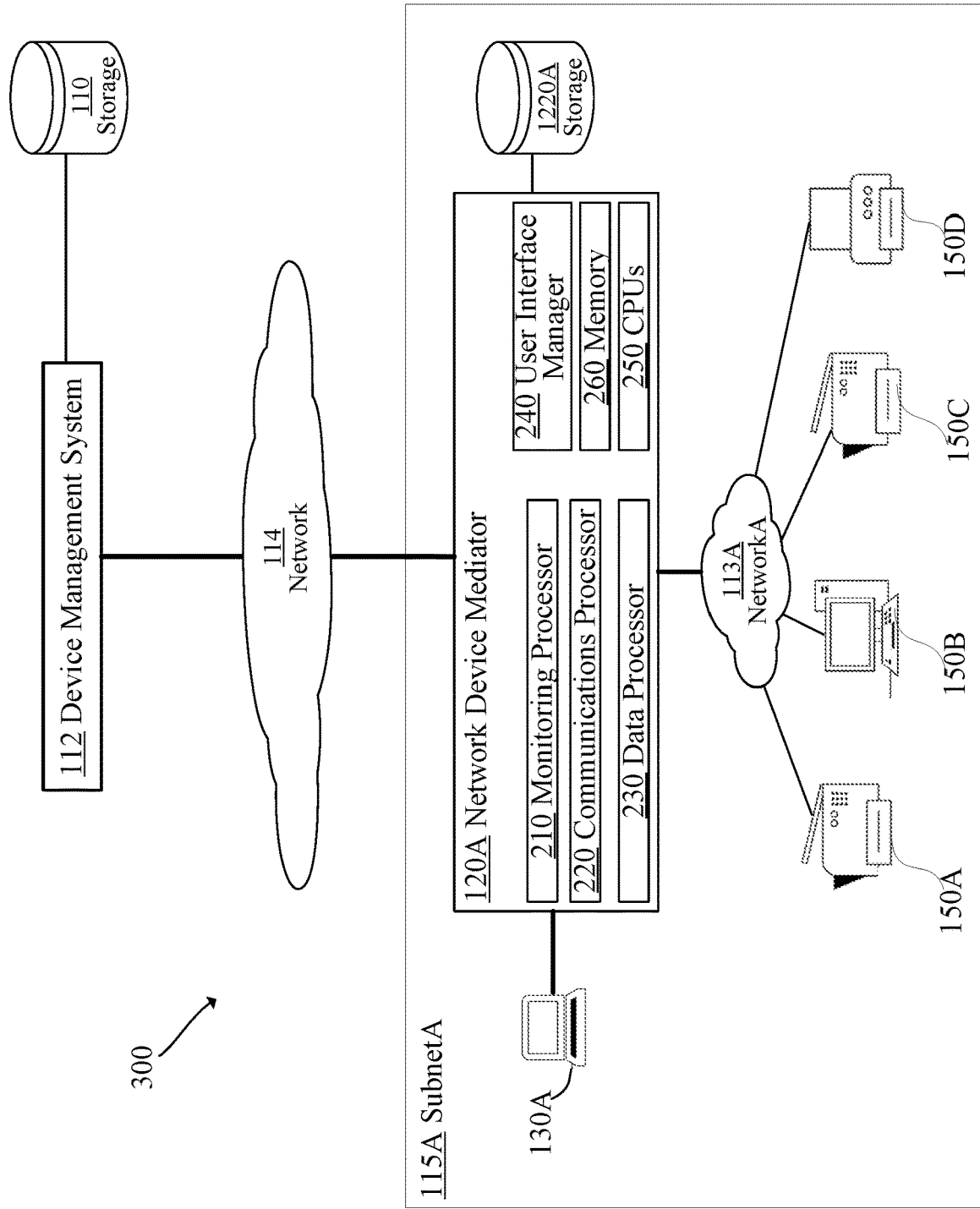
FIG. 3 is a block diagram that depicts an example architecture for configuring and managing network devices using a network mediator.

FIG. 3 is a block diagram that depicts an example architecture 300 for configuring and managing network devices using a network mediator. Example architecture 300 includes device management system 112, one or more storage devices 110, one or more networks 114, and subnet 115A. Subnet 115A includes network devices mediator 120A, a storage device 1220A, a network 113A, and one or more output devices 150A, 150B, 150C, 150D. Examples of output devices include multifunctional peripheral devices, printers, scanners, faxes, as well as laptops, personal computers, workstations, tablets, and so forth. In the depicted example, output device 150A corresponds to a multifunctional peripheral device, output device 150B corresponds to a workstation, output device 150C corresponds to a printer, and output device 150D corresponds to a fax machine. Other implementations may include fewer output devices or additional devices not depicted in FIG. 2. Architecture 300 encompasses a portion of architecture 200 depicted in FIG. 2.

In FIG. 3, device management system 112 is configured to communicate with subnet 115A via one or more communications networks 114. Furthermore, device management system 112 may be configured to store and provide one or more policies for configuring and managing output devices 150A-D in subnet 115A.

A. Example Network Mediator

A network mediator is a computer device or a computer program application designed to receive policies from device management system 112, and to control and manage one or more output devices according to the policies. The mediator may be implemented as a standalone computer device, such as mediators 120A and 120C, and are described in FIG. 2-3. Alternatively, a mediator may be implemented as a computer program application executing in an output device. Such include mediators 161A-B, and 181A-B, described in FIG. 6.

Mediator 120A may be configured to manage output devices 150A-D in subnetwork 115A, and may be implemented in any type of a computing device, such as a workstation, a mainframe, a cloud-based server, and the like.

Mediator 120A may be configured to communicate with device management server 112, request one or more policies for output devices 150A-D in subnet 115A, generate queries based on the receive policies, transmit the queries to output devices 150A-D, receive responses to the queries from the output devices, and transmit the responses to device management system 112.

Mediator 120A may be configured with an operator console 130A. The operator console may include an input device such as a keyboard, and a display device. The operator console may also be implemented in a portable device such as a smartphone, a tablet, and the like.

Mediator 120A may manage output devices 150A-D according to policies received from device management system 112. This scheme is referred to as a polling scheme because it includes polling the policies from device management system 112, and responding, to device management system 112, by polling information from output devices 150A-150D and transmitting the polled information to device management system 112. The polling scheme is described in detail in FIG. 2.

Mediator 120A may manage output devices independently from, or in addition to, policies received from device management system 112. This scheme is referred to as a push scheme because it includes pushing information collected from the output devices to device management system 112 even if device management system 112 has not requested the information. The push scheme is described in detail in FIG. 2.

A mediator, regardless of whether it is configured as a standalone hardware device or as a software component of an agent, may have assigned a globally unique identifier ("GUID"). If the mediator is implemented as a standalone hardware device, then a GUID may be a Media Access Control (MAC) address of the standalone hardware device. If the mediator is implemented as a software component of the network device, then a GUID may be generated based on the MAC address of the network device, or based on any other identification of the network device as long as the resulting GUID is globally unique. The GUID may be a secure identifier that could be digitally signed to provide secure authentication mechanisms for the mediator.

Although configurations of mediators may vary, in an embodiment, network mediator 120A comprises one or more monitoring processors 210, one or more communications processors 220, one or more data processors 230, one or more user interface managers 240, one or more central processing units (CPUs), one or more memory units 260, and one or more server data repositories 270.

Processors 210, 220, 230 and user interface managers 240 may be implemented in hardware and/or software, and may be configured to execute programmable instructions to perform specific tasks. For example, monitoring processor 210 may be configured to monitor output devices 150A-D, detect receiving responses from output devices 150A-D, detect events occurring on output devices 150A-D, and the like.

Communications processors 220 may be configured to establish, maintain, and close communications connections between mediator 120A and device management system 112. Communications processors 220 may also be configured to establish, maintain, and close communications connection between mediator 120A and output devices 150A-D. Furthermore, communications processors 220 may be configured to receive policies from device management system 112, use the policies to generate queries, and transmit the queries to output devices 150A-D to cause the output devices to respond with information requested by device management system 112. Communications processors 220 may also be configured to receive responses from output devices 150A-D, and transmit the responses to data processors 230. Furthermore, communications processors 220 may be configured to monitor output devices 150A-B, collect information from output devices 150A-D, and transmit the collected information to data processors 230.

Data processors 230 may be configured to receive responses from output devices 150A-D (or from communications processors 220), parse the responses, and determine whether the parsed responses, or portions thereof, is to be transmitted to device management system 112. Data processors 230 may also aggregate the parsed responses, restructure the aggregated responses, generate reports based on the aggregated or restructured responses, and transmit the reports to communications processors 220.

User interface manager 240 may be configured to generate a user interface, and display the user interface on an operator console 130A. The user interface may be any type of interface, including a graphical user interface (GUI). The user interface may be displayed on operator console 130A, and may be configured to allow a user to provide input to user interface manager 240. Based on the received input, user interface manager 240 may update the user interface.

One or more CPUs 250 may be hardware-based components that are responsible for interpreting and executing commands and instructions of network device management server 120A.

One or more memory units 260 may be any type of physical devices capable of storing information temporarily or permanently. Memory 260 may be implemented for example, as random-access memory (RAM), read-only memory (ROM), and the like, and may be used to store information on integrated circuits used by the operating system, software, and hardware.

Server data repository 270 may be implemented in any type of storage device configured to store data permanently. Server data repository 270 may be used to store for example, mappings from media access control (MAC) addresses onto Internet Protocol (IP) addresses of network devices. Server data repository 270 may also store additional information about the output devices, such as names of the devices.

B. Configuring a Network Mediator

In an embodiment, mediator 120A is configured, or provided, with a GUID of the mediator and an address of a device management system. An address of a device management system may be an IP address of the device management system, a domain network service (DNS) name assigned to the device management system, one or more names assigned to the device management system, or other types of addresses uniquely identifying the device management system. A GUID of the mediator may be a global unique identifier assigned to the mediator.

Configuring mediator 120A with the addresses may be performed by a system administrator when the mediator is configured for the first time or reconfigured at a later time. For example, the administrator may enter the addresses to a configuration file of the mediator and reboot the mediator with the updated configuration file.

Alternatively, an address of a device management system and a GUID of a mediator may be provided to the mediator in a configuration file and automatically downloaded to the mediator when the mediator is configured for the first time or reconfigured at a later time.

In an embodiment, a mediator is configured with access credentials that the mediator may need to communicate with a device management system. The access credentials may include an identifier such as a GUID, or a password that may be required to establish a communication with the device management system.

C. Establishing Connections with a Device Management System

In an embodiment, mediator 120A is configured to establish a communications connection with device management system 112. Since mediator 120A and device management system 112 may be configured on the opposite sites of a firewall maintained by an organization or a company, mediator 120A establishes a secure communications connection with device management system 112 through the firewall. Examples of secure communications connections include Transmission Control Protocol (TCP) communications sessions, or TCP/IP communications sessions established between mediator 120A and device management system 112. Mediator 120A may establish a secure communications connection with device management system 112 over a standard TCP/IP port, an HTTP/S port 433, or any other port configured for providing secure sessions with the device management system.

Once mediator 120A establishes a secure TCP/IP communications connection with device management system 112, mediator 120A may maintain the connection as a persistent TCP/IP connection. The persistent TCP/IP connection may also be referred to as a server request channel. Mediator 120A may use the persistent TCP/IP connection to request policies for output devices 150A-D, to request updates to the policies, to provide responses from output devices 150A-150D, and to provide any other types of notifications and/or communications to device management system 112. Mediator may also use the persistent TCP/IP connection to provide requests and inquiries to device management system 112. Furthermore, mediator 120A may use the persistent TCP/IP connection to receive settings and configuration information from device management system 112 for network devices 150A-D.

D. Authenticating and Authorizing a Mediator

As mediator 120A establishes a communications connection with device management system 112, mediator 120A may provide access credentials to device management system 112. The credentials may include a GUID of mediator 120A, and user credentials such as a user identifier and a user password. In addition to providing the GUID and the user credentials, mediator 112 may be asked to provide the mediator's certificate.

Upon receiving the GUID and the user credentials from mediator 120A, device management system 112 may use the provided information to authenticate mediator 120A to device management system 112. If the provided credentials are valid, then device management system 112 may grant mediator 120A access to resources of device management system 112, and authorize mediator 120A to download one or more policies from storage device 110. This may include granting mediator 120A access to the policies for configuring and managing output devices 150A-D.

In addition to, or optionally, upon receiving a certificate from mediator 120A, device management system 112 may use the provided certificate to validate credentials of mediator 120A. If the provided certificate is valid, then device management system 112 may grant, or authorize, access to the resources of device management system 112.

E. Configuring and Managing Output Devices

In an embodiment, mediator 120A is enabled to configure and monitor output devices 150A-D configured in subnetA 115A. To configure and monitor network devices 150A-150D, mediator 120A may use SNMP-based messages to communicate with agents implemented in network devices 150A-D. The SNMP-based messages may be generated based on policies received for output devices 150A-150D from device management system 112.

For example, mediator 120A may use a policy received for output device 150A to generate an SNMP query to request information as specified by the policy, send the SNMP query to output device 150A to request the information, and await a response from output device 150A. Examples of SNMP queries may include a request to implement configuration settings on output devices 150A, a request to provide status information of output device 150A, a request to provide an alert each time output device 150A is out of paper, a request to provide an alert each time output device 150A is low on toner, a request to provide a status update from output device 150A every 2 hours, a request to provide a status information of output device 150A every Sunday, and the like.

In response to sending an SNMP query, mediator 150A may receive a response from output device 150A. The response from output device 150A may be provided to mediator 150A as an SNMP response. Upon receiving the SNMP response, mediator 120A may parse the response, and determine whether the parsed information includes the information requested in the SNMP query. If the SNMP response includes the requested information, then mediator 150A may aggregate and/or restructure the SNMP response, and transmit the aggregated/restructured response to device management system 112. The restructuring may include for example, converting the SNMP response to a payload in compliance with the TCP/IP protocol or the HTTP protocol, and then transmitting the compliant message to device management system 112. If the SNMP response does not include the requested information, then mediator 150A may resend the SNMP query to output device 150A, and/or notify device management system 112 that the requested information has not yet been obtained.

To configure and monitor network devices 150A-150D, mediator 120A may also use SNMP messages that may be generated based on policies that mediator 120A itself generated for output devices 150A-150D. These policies may be generated by mediator 120A itself based on information provided to mediator 120A directly by a system administrator, or configured on mediator 120A independently from the policies received from device management system 112. These policies are to be distinguished from the policies received by mediator 120A from device management system 112.

For example, mediator 120A may monitor output device 150A by sending SNMP-based requests for information to output device 150A, collecting the requested information from output device 150A, transmitting the collected information to device management system 112, receiving, in response thereto, instructions/requests from device management system 112, and transmitting the instructions/requests from mediator 120A to output device 150A. Suppose that mediator 120A stores a policy for output device 150A that pertains to monitoring status information of output device 150A every 3 hours. Based on that policy, mediator 120A may poll status information of output device 150A every 3 hours. If, by performing the periodical testing, mediator 120A detects that output device 150A is low on paper, then mediator 120A may communicate an alert to device management system 112 to request that a field engineer replenish paper resources on output device 150A.

Figure 4:
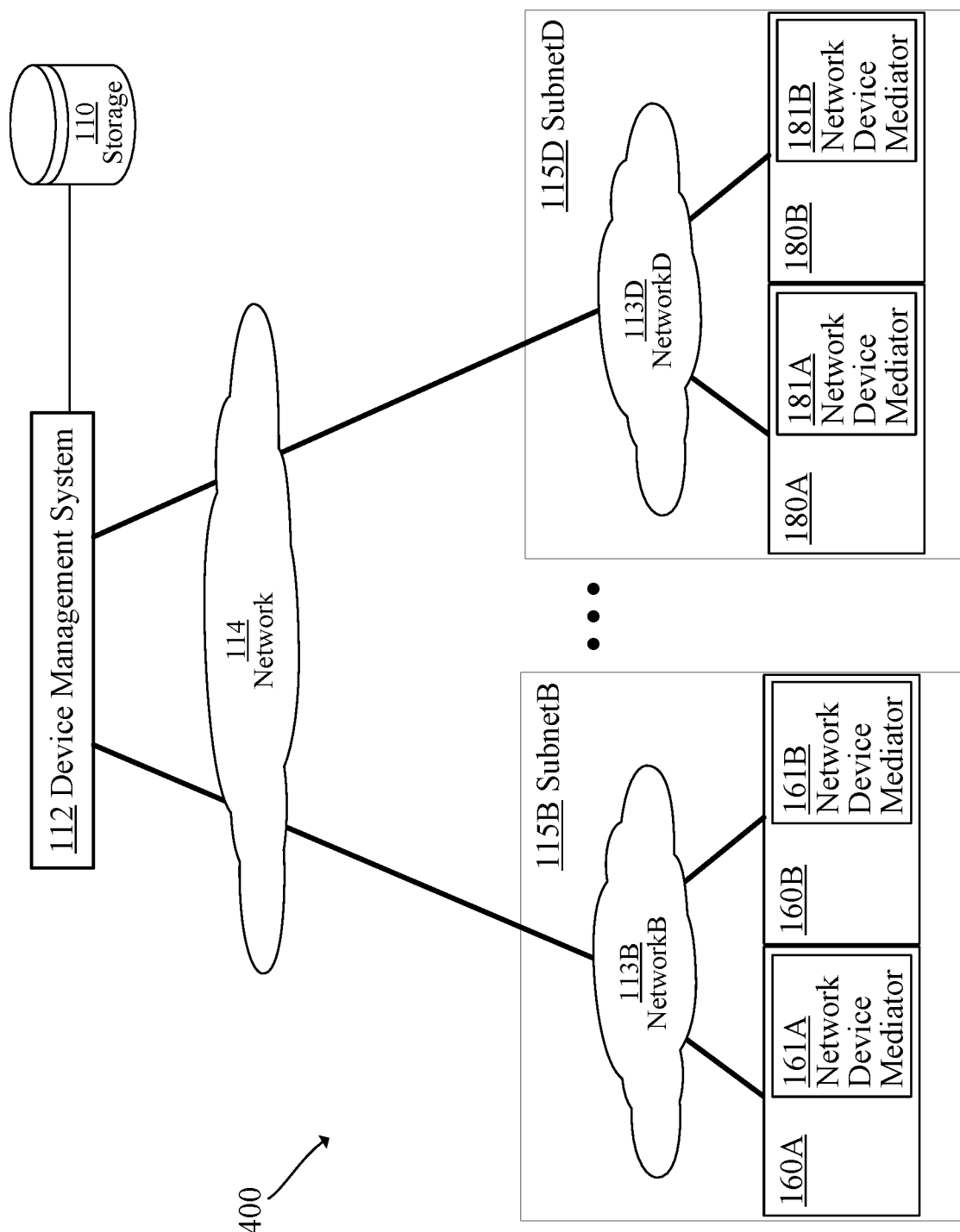
FIG. 4 is a block diagram that depicts an example architecture for configuring and managing network devices using network mediators embedded in the network devices.

V. Example Architecture for Configuring and Managing Network Devices Using Network Mediators Embedded in Output Devices FIG. 4 is a block diagram that depicts an example architecture 400 for configuring and managing network devices using network mediators embedded in the network devices. Example architecture 400 includes device management system 112, one or more storage devices 110, one or more networks 114, one or more subnets 115B, 115D, one or more output devices 160A, 160B, 180A, 180B, and one or more mediators 161A, 161B, 181A, 181B implemented in respective output devices 160A, 160B, 181A, 181B. Architecture 400 encompasses a portion of architecture 100 depicted in FIG. 1.

Subnet 115B includes one or more output devices 160A, 160B. Output device 160A implements network devices mediator 161A, while output device 160B implements a network device mediator 161B. Subnet 115B may also include one or more computer networks 113B, and optionally, storage repositories (not depicted in FIG. 4).

Subnet 115D includes one or more output devices 180A, 180B. Output device 180A implements network devices mediator 181A, while output device 180B implements a network device mediator 181B. Subnet 115D may also include one or more computer networks 113D, and optionally, storage repositories (not depicted in FIG. 4).

In FIG. 4, device management system 112 is configured to communicate with subnet 115B and subnet 115D via one or more communications networks 114. Furthermore, device management system 112 may be configured to store and provide one or more policies for configuring and managing output devices 161A-B in subnet 115B, and provide one or more policies for configuring and managing output devices 181A-B in subnet 115D.

Mediators 161A, 161B, 181A, 181B may be implemented as computer program applications installed and executing on output devices 160A, 160B, 180A, 180B, respectively. Specifically, mediator 161A may be configured to manage output device 160A in subnetwork 115A. Mediator 161B may be configured to manage output device 160B in subnetwork 115A. Mediator 181A may be configured to manage output device 180A in subnetwork 115D. Mediator 161B may be configured to manage output device 180B in subnetwork 115D.

Mediator 161A/161B/181A/181B may be configured to communicate with device management server 112; request one or more policies for output device 160A/160B/180A/180B, respectively; generate queries based on the receive policies; transmit the queries to output device 160A/160B/180A/180B, respectively; receive responses to the queries from the output devices; and transmit the responses to device management system 112.

Mediator 161A/161B/181A/181B may manage output device 160A/160B/180A/180B, respectively, according to policies received from device management system 112. This scheme is referred to as a polling scheme because it includes polling the policies from device management system 112, and responding, to device management system 112, by polling information from mediator 161A/161B/181A/181B. The polling scheme is described in detail in FIG. 2.

Mediator 161A/161B/181A/181B may also manage output device 160A/160B/180A/180B, respectively, independently from, or in addition to, policies received from device management system 112. This scheme is referred to as a push scheme because it includes pushing information collected from the output devices to device management system 112 even if device management system 112 has not requested the information. The push scheme is described in detail in FIG. 2.

VI. Example Policies for Configuring and Managing Network Devices

A policy for a network device is a set of rules that set forth the manner for configuring and managing the network device. The policies are usually generated by device management system 112; however, some policies may also be generated by mediators.

A policy may be unique to a network device, or to a group of devices. The policy may specify, for example, the type of information that is to be collected from the network device, a schedule for collecting information from the network device, one or more settings that are to be implemented on the network device, one or more conditions that are to be tested on the network device, one or more remedial actions that are to be performed with respect to the network device when the one or more conditions occurred on the network device, one or more actions that are to be performed when certain information is received from the device, and the like. For example, a policy may specify that status information of the network device is to be polled from the device every other day, and if the status information provides an indication of a problem occurring on the network device, then the policy may specify that mediator 120A needs to provide the status information to device management system 112.

Figure 5:
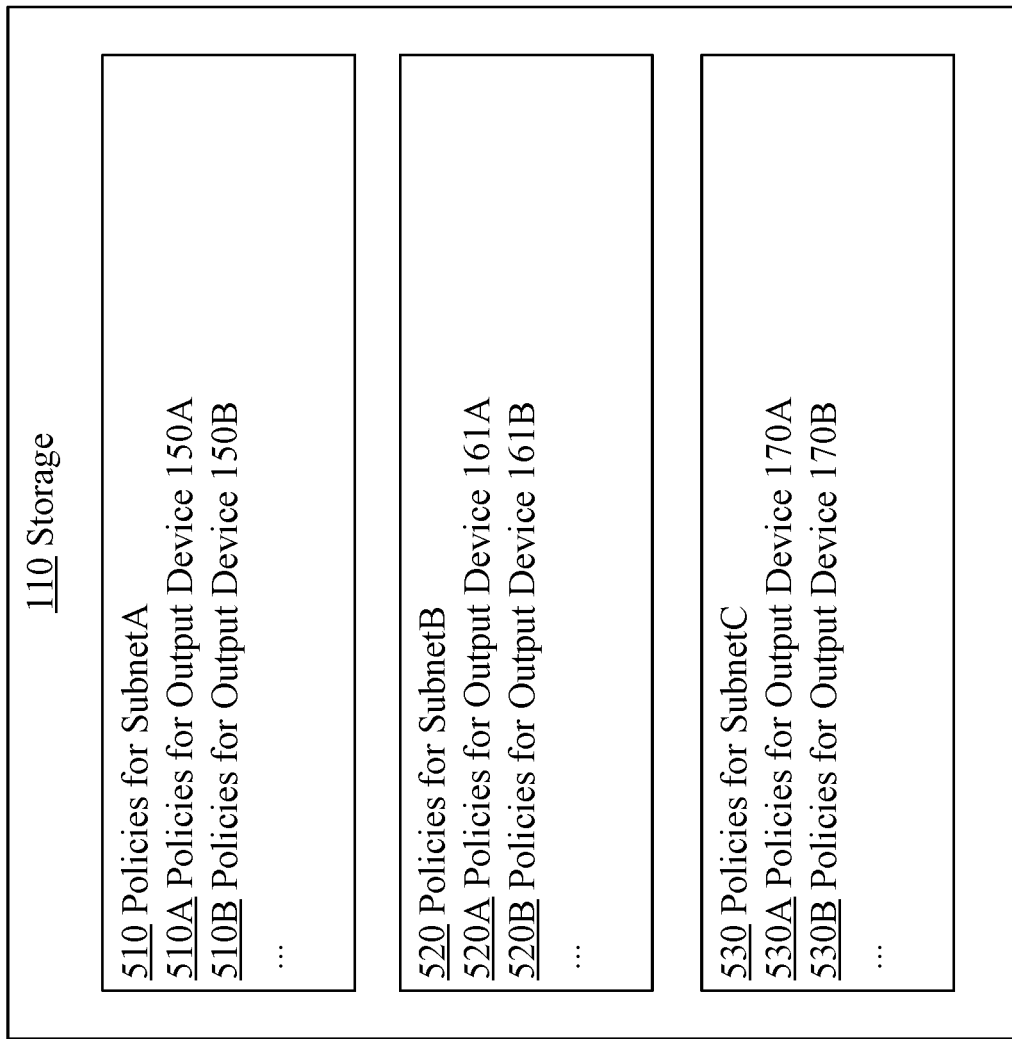
FIG. 5 depicts example policies for configuring and managing output devices.

FIG. 5 depicts example policies for configuring and managing output devices. The policies may be stored in one or more storage devices 110, which may be implemented in a cloud storage system, and on-site storage system, an off-site storage system, or any type of data repository available to device management system 112.

In the depicted example, policies 510 for subnetA include policies 510A for output device 150A, policies 510B for output device 150B, and so forth. Policies 520 for subnetB include policies 520A for output device 161A, policies 520B for output device 161B, and so forth. Policies 530 for subnetC include policies 530A for output device 170A, policies 530B for output device 170B, and so forth.

Policies for configuring and managing output devices may be specific to subnets managed by device management system 112. Optionally, or in addition, the policies may be specific not only to the subnets, but also to output devices implemented in the subnets. Furthermore, the policies may be specific to output devices implemented in the subnets, but not specific to the subnets. For example, if device management system 112 manages three subnets, then storage 110 may store one or more policies for each subnet that device management system 112 manages, and the policies for a subnet may include individual policies for the output devices implemented in the subnet. According to another example, if device management system 112 manages three subnets: a subnetA, a subnetB, and a subnetC, then storage 110 may store one or more policies for the subnetA, one or more policies for the subnetB, and one or more policies for the subnetC. The policies for different subnets may be different or the same. Similarly, the policies for different devices may be different or the same. For example, storage 110 may store one policy for all multifunctional peripheral devices implemented in the subnetA and in the subnetB, and store other policies for each other device in any of the subnets A-C. The selection of the policies and the associations between the policies and the subnets and/or output devices may be determined by a system administrator of device management system 112, or a managing program application executing in device management system 112.

VII. Poll-Based Monitoring

Device management system 112 may monitor and manage output devices by causing mediator 120A to poll information from the output devices. The type of information to be polled from the output devices is usually defined in policies that mediator 120A may download from device management system 112.

A policy may include for example, instructions specifying that mediator 120A is to provide status information of a particular multifunction peripheral device (MFP) every other day if the status information indicates that a count of data traffic retransmissions exceeds a certain threshold value, or if the status information indicates that the ink is below a certain threshold level.

According to another example, a policy may include instructions specifying that mediator 120A needs to send an update to device management system 112 when status values of one or more configuration parameters of an output device change by a certain value or below a certain level.

According to other example, a policy may include instructions for polling a complete set of the status parameters of an output device. If the device is a MFP device, then this may include providing the status information of all parameters maintained by the MFP in the device's configuration file.

In an embodiment, mediator 120A may determine its own policy for monitoring a network device. For example, mediator 120A may determine when to poll information from the network device, what type of information is to be polled from the network device, how the received information is to be processed, and one or more conditions which, when met, may prompt mediator 120A to provide an update to device management system 112.

For example, a policy may specify that mediator 120A needs to poll information from output devices and provide updates to device management system 112 every certain number of minutes, or every certain number of hours, or every certain number of days. The policy may also specify that certain types of information, such as an indication of malfunctioning or a problem, is to be reported to device management system 112 immediately. The policy may set forth a schedule and priorities for sending reporting messages to device management system 112.

VIII. Push-Based Monitoring

In an embodiment, mediator 120A receives information from an output device, and even if device management system 112 has not requested an update from the output device, mediator 120A transmits the received information to device management system 112. This type of monitoring of the output device is referred to herein as a push-based monitoring.

For example, mediator 120A may receive an SNMP trap from an output device, and determine that the trap pertains to a problem occurring on the device. Thus, mediator 120A may generate one or more messages to provide an update to device management system 112. In this situation, mediator 120A may push the information indicating the problem to device management system 112 even if device management system 112 has not requested such an update.

According to another example, mediator 120A may monitor an output device after the device was repaired or behaved unpredictably. The monitoring may include determining whether the repairs have been satisfactory and whether the output device functions properly. If mediator 120A determines that the output device does not function properly, then mediator 120A may push an update to device management system 112.

According to other example, mediator 120A may monitor values of certain configuration parameters of an output device. If values of the parameters exceed certain thresholds or fall below certain thresholds, then mediator 120A may push an update to device management system 112 even if device management system 112 has not requested such an update.

IX. Traps

In an embodiment, a network device may voluntarily transmit SNMP messages to mediator 120A. SNMP is a standard protocol that is used to control network devices in computer networks, and report critical events occurring in the network. The main advantage of this protocol is that it is supported by many devices, and thus enables the devices to communicate with each other. SNMP operates based on a manager-agent model, where agents are network devices and a manager manages the network devices. The agents may receive instructions from the manager, execute the instructions, provide responses to the manager, and/or report status information to the manager.

Examples of SNMP messages include: TRAP, GET, GET-NEXT, GET-RESPONSE, and SET. These messages are used as means for communicating between SNMP agents sand a SNMP manager.

The most frequently used SNMP messages are TRAPs. A TRAP is an SNMP message that is sent by an agent to a manager when the agent detected a problem, and the problem needs to be reported to the manager. TRAPs are usually initiated directly by an SNMP agent. The TRAPS provide a convenient way for an SNMP agent to inform the manager about issues and problems occurring on the network devices. For example, an agent may use a TRAP message to notify the device management system of events such as a paper jam, a printer failure, a scanner failure, a low-paper level, a power failure, and the like.

TRAPs are particularly helpful in communications networks that include many network devices. A manager managing a large computer network may be unable to poll or request information from every network device and every object implemented in every network device. To solve that problem, the agents implemented in the network devices may generate the TRAPs, and send them to for example, mediator 120A each time the agents detect problems occurring on the network devices.

Once mediator 120A receives a TRAP message from an agent executing on a network device, mediator 120A may parse the message, analyze it, and determine a remedial action to resolve the reported problem. For instance, mediator 120A may determine that the TRAP message needs to be communicated to device management system 112, or that additional information needs to be requested from the network device, or that the TRAP message may be ignored this time.

X. Status Information

Among diverse types of information that a device management system may request from a network device is a management information base (MIB) file. An MIB file includes a formal description of the network objects that are implemented in the device and that can be managed using SNMP. An MIB file may be an ASCII text file that describes data objects that may be used to define attributes of the network device. An MIB file may be requested to provide information about a device.

A request for an MIB file may be sent by a mediator to a network device as an SNMP request. The SNMP request may use a MAC address of the device as the message's destination address. In response to sending the SNMP request, the mediator may receive the MIB file from the network device. Upon receiving the MIB file from the device, the mediator may parse the file to identify the configuration and/or settings of the device. For example, the mediator may parse the MIB file and identify, in the MIB file, an IP address of the device, a name of the device, and so forth.

XI. Status Alerts

In an embodiment, network devices may provide status alerts to mediator 120A. Status alerts generated by the network devices are conceptually similar to SNMP TRAPs, but have assigned higher priorities than the SNMP TRAPs.

A status alert provided by a network device to mediator 120A may be immediately transmitted from mediator 120A to device management system 112. The status alert may have assigned a higher priority than other information that does not indicate the status alert. For example, if a network device provided an alert to mediator 120A, then mediator 120A may transmit the alert to device management system 112 with a high priority to encourage device management system 112 to process the alert immediately. However, if a network device provided, to mediator 120A, a status update that does not indicate an alert, then mediator 120A may transmit the status update to device management system 112 with a low priority.

XII. Device Configuration and Validation

In an embodiment, mediator 120A periodically requests, from device management system 112, updated device configuration information for one or more network devices. For example, after mediator 120A determined that a network device was malfunctioning and then repaired, mediator 120A may request the updated device configuration for the network device.

Upon receiving the updated device configuration for the network device, mediator 120A may download the updated device configuration data to the network device, cause the network device to reboot or restart, and validate whether the network device performs now as expected.

Figure 6:
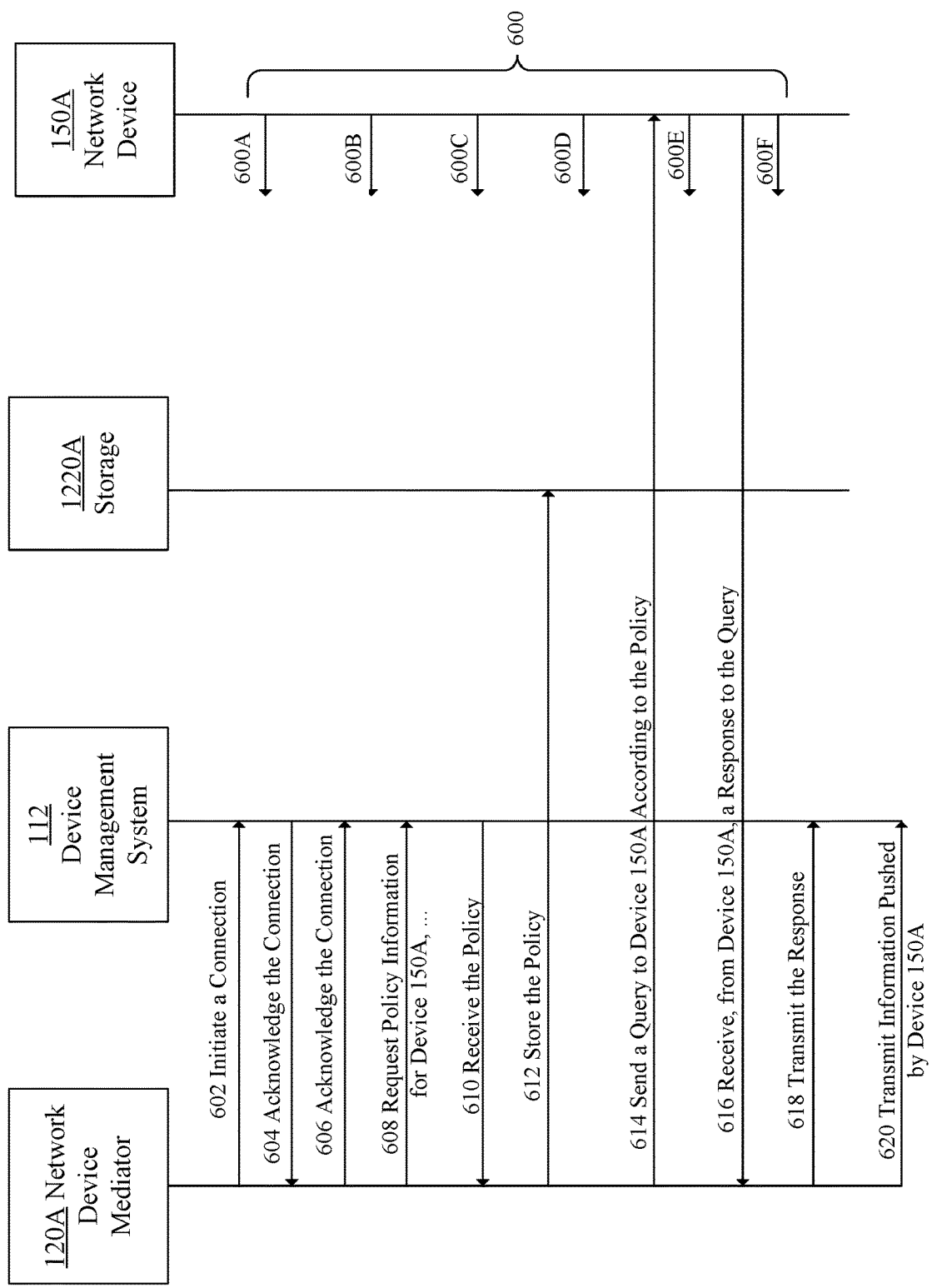
FIG. 6 depicts an example time chart for communications exchanged between an example network device mediator, an example device management system, an example storage device, and an example output device.

XIII. Example Time Chart for Cloud-Based, Configuring and Managing Network Devices Using Network Mediators FIG. 6 depicts an example time chart for communications exchanged between an example network device mediator 120A, an example device management system 112, an example storage device 1220A, and an example output device 150A.

To initiate the process of configuring and managing network devices using a network mediator, network mediator 120A generates and transmits, to device management system 112, a request 602 to establish a communications connection between mediator 120A and device management system 112.

Depending on the implementation, the process of establishing a communications connection may include exchanging messages between mediator 120A and device management system 112. One way to establish a communications connection is to establish a TCP communications connection, provided that mediator 120A is configured as a TCP client and device management system 112 is configured as a TCP server. To establish a communications connection in a TCP environment, each device needs to send a synchronization (SYN) request, and receive an acknowledgment (ACK) for it from the other device. The process of exchanging the SYNs and ACKs between two devices to establish a TCP communications channel is referred to as a TCP three-way handshake. Alternatively, a communications connection may be established using other methods and approaches.

Establishing a TCP communications connection between mediator 120A and device management system 112, may include sending, from mediator 120A, a TCP synchronization 602 (SYN) request to device management system 112.

In response to receiving the SYN request from mediator 120A, device management system 112 may respond with its own SYN request and an acknowledgment ACK 604 to mediator 120A.

In response to receiving the SYN and ACK from device management system 112, mediator 120A may respond with its own ACK 606 to device management system 112. This completes the TCP three-way handshake. At this point, the TCP communications channel between mediator 120A and device management system 112 is established.

Optionally, in addition to establishing a communications connection, mediator 120A may authenticate itself to device management system 112. Different approaches for authenticating mediator 120A to device management system 112 are described above.

Once the communications connection between mediator 120A and device management system 112 is established, mediator 120A sends a request 608 to device management system 112 to provide one or more policies for output devices that mediator 120A manages.

In response to receiving the request from mediator 120A, device management system 112 generates and transmits a response 610 to mediator 120A. The response may include one or more policies for configuring and managing the devices that mediator 120A. Alternatively, the response may include a hyperlink to a storage space in a storage device from which mediator 120A may download the policies.

Upon receiving the policies, mediator 120A stores the policies in a storage device 1220A. Storage device 1220A may be a storage device that is locally available to mediator 120A, or a storage device that is available to mediator 120A via one or more communications networks, including a cloud-based network.

Based on the received policies, mediator 120A may generate one or more instructions that, when executed, will cause network devices to provide the information requested by the policy. For example, mediator 120A may generate an SNMP query 614 that specifies the type of information that mediator 120A requests from output device 150A. Query 614 may be transmitted directly to output device 150A, or stored in an instruction repository (not depicted in FIG. 6) from which device 150A may retrieve query 614.

In response to receiving query 614, output device 150A may collect, or otherwise obtain, the information requested by the query, and transmit the information as a response 616 to mediator 120A. Response 616 may include for example, status information polled from output device 150A, configuration parameters of the configuration of output device 150A, and the like.

Upon receiving response 616, mediator 120A may process response 616 to determine whether response 616 is to be reported to device management system 112. This may include parsing response 616, aggregating the parsed information with for example, some other types of information, and restructuring the resulting information to a message 618. Message 618 is then transmitted from mediator 120A to device management system 112 via the already established communications connection.

In addition to collecting information from network device 150A according to the policy received from device management system 112, mediator 120A may receive voluntary updates from network 150A at any time. The voluntary updates may include SNMP TRAPs, status updates from network device 150A, alarms and warning generated and detected by network device 150A, and any other information that network device 150A voluntarily provided to mediator 120A. This may include any of updates 600, such as updates 600A-F depicted in FIG. 6.

Mediator 120A may either report one or more updates 600A-F individually, or collect updates 600A-F, and transmit the collected information 620 to device management system 112 when mediator 120A determines that the collected updates need to be reported to device management system 112.

Figure 7:
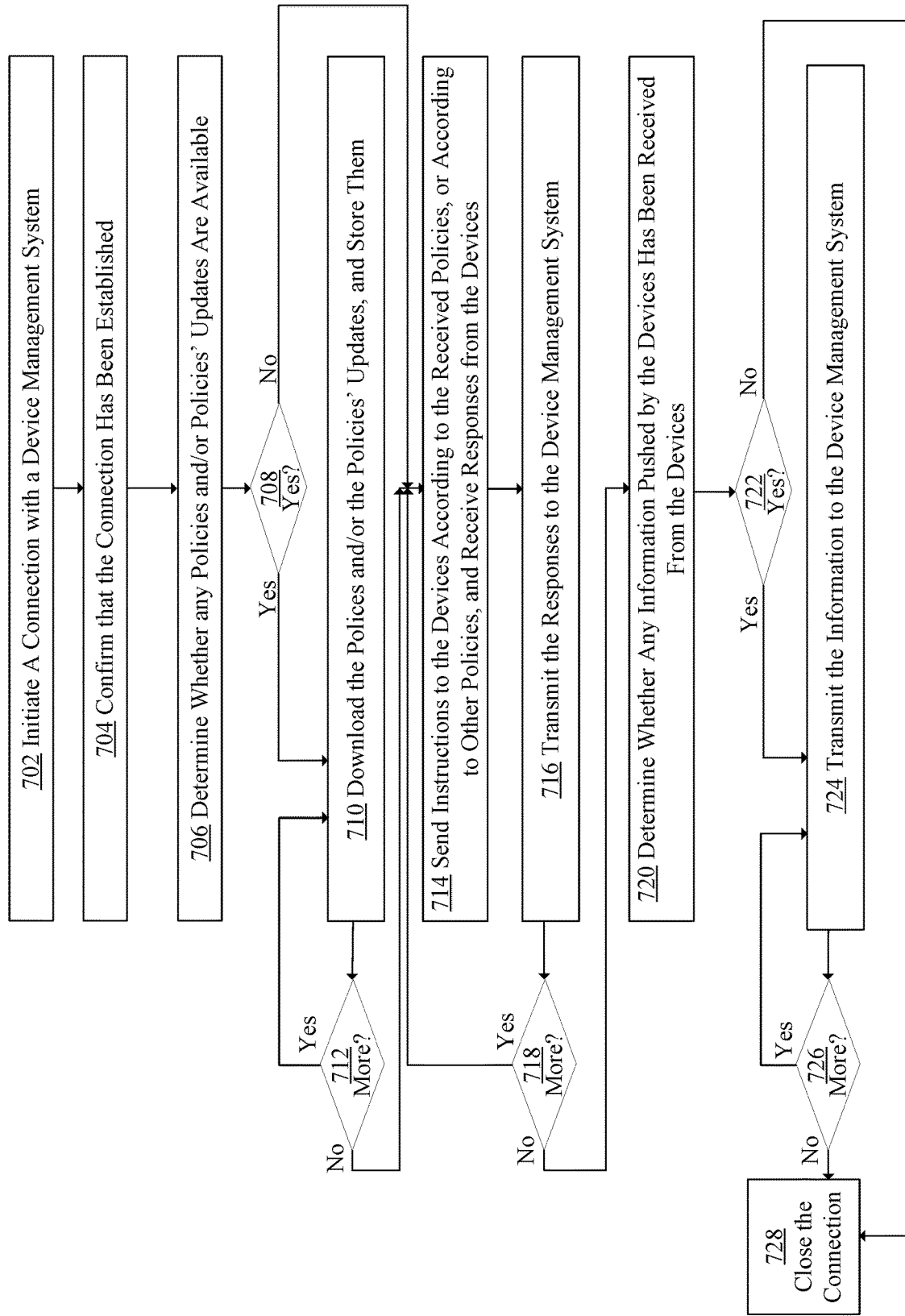
FIG. 7 depicts an example flow chart for configuring and managing network devices using network mediators.

XIV. Example Process for Cloud-Based Configuring and Managing Using Network Mediators FIG. 7 depicts an example flow chart for configuring and managing network devices using network mediators. In step 702, a mediator initiates a communications connection with a device management system. The mediator may be implemented as a standalone computer server or as a program application executing on an output device. The device management system may be implemented in a standalone computer server or a distributed computer system. The communications connection may be any type of communications connection that both the mediator and the device management system support. For example, if the mediator and the device management system support the TCP/IP, then the mediator may initiate a TCP communications connection relying on a three-way handshake described in FIG. 6 (messages 602, 604, 606).

In step 704, the mediator transmits to the device management system a confirmation that the communications connection between the mediator and the device management system has been successfully established. This may correspond to message 606 in FIG. 6.

In step 706, the mediator sends a request to the device management system to determine whether one or more policies, and/or one or more updates to the policies, are available for the subnet that the mediator manages and/or for the output devices that the mediator manages. The request may be an HTTP request or a SOAP request to allow the mediator to access a data repository stored in storage device 110 depicted in FIG. 1, and determine whether any policy or any updates are available for the subnet and/or the output devices that the mediator manages. The determining may include determining network addresses of the output devices and/or the subnets, and checking whether storage device 110 stores any policies and/or updates indexed using the determined network addresses.

In step 708, the mediator tests whether any policies and/or policy updates are available for downloading. If at least one policy or one update is available, then the mediator proceeds to step 710. Otherwise, the mediator proceeds to step 714.

In step 710, the mediator downloads the policies and/or the policy updates that are available from the device management system for the subnet and/or the output devices that the mediator manages. The mediator may download the policies and/or the updates to a local storage device accessible to the mediator. The local storage device may include for example, storage device 1220A depicted in FIG. 3.

To download the policies or the updates, the mediator may access the data repository stored in storage device 110, and initiate the file transfer. Alternatively, the mediator may use a hyperlink that may be provided by the device management system and that points to a storage space in a cloud storage system. The mediator may use the provided hyperlink to access the storage space and download the policies and/or the updates from the storage space.

In step 712, the meditator tests whether any additional policies and/or updates are available for the mediator's subnet and/or network devices, but have not been yet downloaded by the mediator. If additional policies and/or updates are available, then the mediator proceeds to step 710, and continues downloading the policies and/or the policy updates. Otherwise, the mediator proceeds to step 714.

In step 714, the mediator generates one or more instructions based on the received policies and/or policies updates, and sends the instructions to the network devices that the mediator manages. The instructions may be SNMP-based instructions, and may include for example, configuration parameters that have been provided in the received policies. By sending the instructions that include the configuration parameters to the network devices, the mediator may configure the network devices by causing the network devices to accept the configuration settings.

The instructions may also include requests for providing certain types of data from the network devices. By sending the instructions that include the information requests, the mediator may poll the requested information from the network devices, and upon receiving the requested information, transmit the information to the device management system. The instructions may also include a time table that specifies the frequency with which the information is to be polled from the network devices, or reported to the device management system.

In step 716, the mediator receives responses from the network devices. Upon receiving the responses, the mediator may analyze the received responses, aggregate them, restructure them, and/or translate to messages that may be sent to the device management system. For example, the mediator may include contents of the responses in payloads of HTTP messages or SOAP messages that are compatible with the communications protocols that both the mediator and the device management system use to communicate with each other.

Once one or more reporting messages are prepared by the mediator, the mediator transmits the reporting messages to the device management system.

In step 718, the mediator tests whether there are any additional instructions that need to be sent to the network devices, but that have not yet been sent. If there are such instructions, then the mediator proceeds to step 714. Otherwise, the mediator proceeds to step 720.

In step 720, the mediator determines whether the mediator received any information from one or more network devices that has been provided to the mediator even though the mediator has not requested such information. This type of information may be referred to as a voluntary notification, and may include the information that a network device pushed to the mediator because the device detected errors and/or problems occurring in the device itself. For example, upon detecting a paper jam, or a low-paper condition, a network printer may generate an SNMP TRAP, and transmit the TRAP to the mediator even if the mediator has not requested such updates.

In step 722, the mediator determines whether any voluntary notification has been received from any of the network devices. If such a notification has been received, then the mediator proceeds to step 724. Otherwise, the mediator proceeds to step 728.

In step 724, the mediator determines whether the received voluntary notifications need to be transmitted to the device management system. If they are, then the mediator transmits all of them, or some of them, to the device management system. For example, the mediator may determine if the received voluntary notification includes a SNMP TRAP, and if it does, then the mediator may transmit the TRAP to the device management system.

In step 726, the mediator determines whether any additional voluntary notifications have been received from any of the network devices. If such notifications have been received, then the mediator proceeds to step 724. Otherwise, the mediator proceeds to step 728.

The mediator reaches step 728 when the mediator finished downloading policies and/or policy updates from the device management system, finished sending instructions to the network devices, finished transmitting responses to the device management system, and finished transmitting voluntary notifications to the device management system. In step 728, the mediator may close the active communications connection with the device management system. Alternatively, the mediator may keep the communications connection with the device management system open, and use the connection to download new policies and/or updates when such become available, transmit new instructions to the network devices, transmit new responses to the device management system, and/or transmit new voluntary notifications to the device management system.

XV. Improvements Provided by Certain Embodiments

In an embodiment, an approach for improving the process of configuring and managing network devices using network mediators is presented. The approach allows to improve the management of network devices such as printers, multifunction peripheral devices, scanners, fax machines, as well as workstations, tablets, and the like.

In an embodiment, the improved approach allows a cloud-based device management system to configure network devices using network mediators. The mediators act as proxies for the device management system. The mediators communicate with the device management system across local firewalls, and communicate the instructions from eth device management system to the network devices that otherwise could not be managed by the device management system. The mediators exchange HTTP messages, HTTP/2 messages, and/or SOAP messages with the device management system, and exchange SNMP-based messages with the network devices. The mediators may communicate with SNMP-based agents executing on the network devices even if the agents are passive and/or unable to communicate themselves directly with the device management system.

In an embodiment, the improved approach allows a cloud-based device management system to use mediators to manage and configure network devices that may be located in private and secure communications networks. The mediators may act as proactive agents that communicate with the device management system via outbound connections through the Internet firewall and other security mechanisms implemented in the network.

XVI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
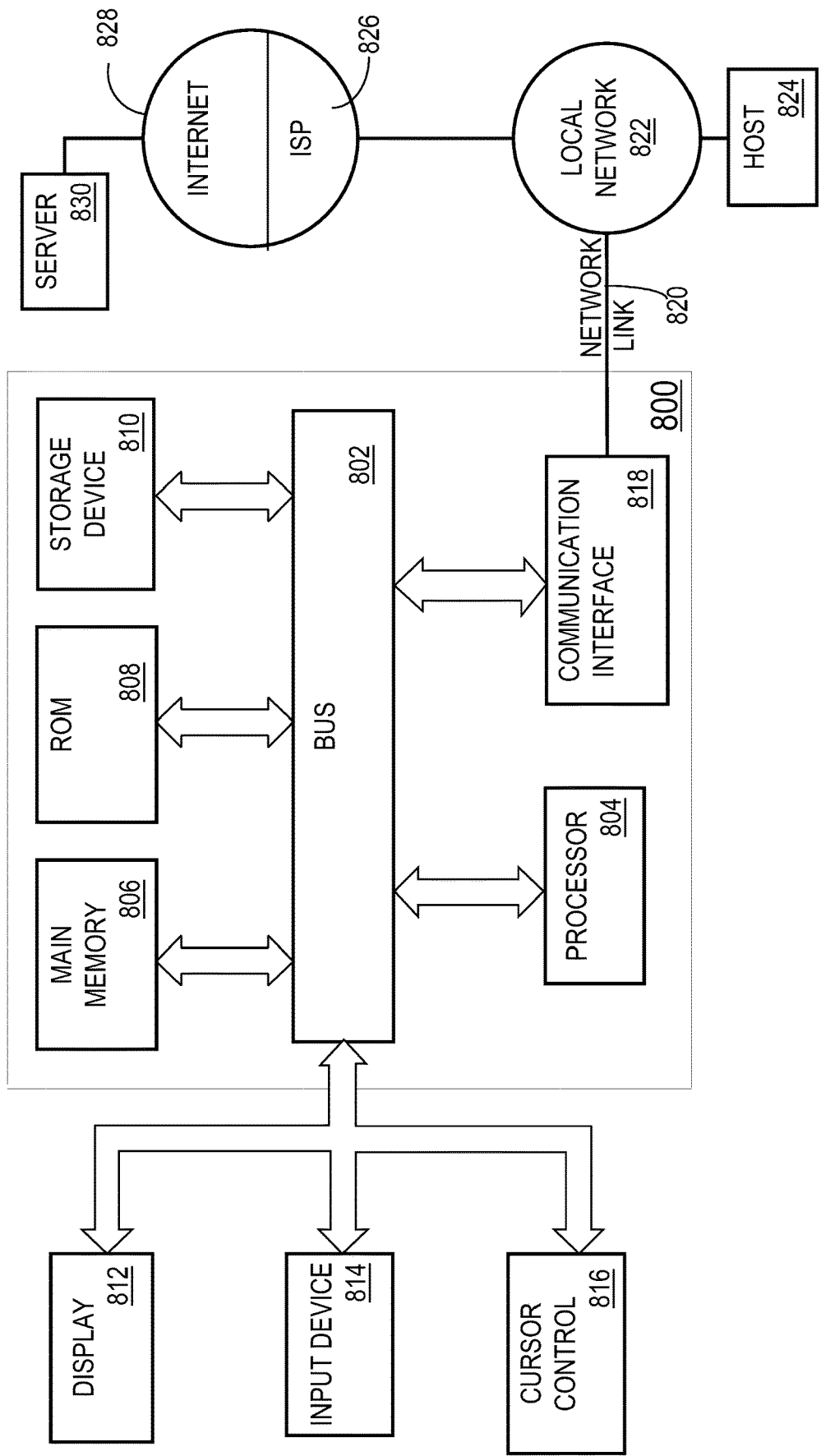
FIG. 8 is a block diagram that depicts an example computer system upon which embodiments may be implemented.

FIG. 8 is a block diagram that depicts an example computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the approach. Thus, embodiments are not limited to any specific combination of hardware circuitry and software.

The term "computer-readable medium" as used herein refers to any medium that participates in providing data that causes a computer to operation in a specific manner. In an embodiment implemented using computer system 800, various computer-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated service digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network mediator device comprising:
   a processor;
   a memory unit;
   a network mediator application executing on the network mediator device and being configured to perform:
   receiving, at the network mediator device, from a device management server, one or more policies for configuring or managing one or more network devices, wherein the network mediator device is separate from the device management server and separate from the one or more network devices; and
   for each policy of the one or more policies:
      determining, by the network mediator device, a network device, from the one or more network devices, to which the policy applies;
      based on the policy, generating, by the network mediator device, one or more instructions for configuring or managing the network device;
      transmitting, by the network mediator device, the one or more instructions to the network device;
      receiving, by the network mediator device, from the network device, a response to the one or more instructions;
         determining, by the network mediator device, whether the response satisfies one or more conditions set forth in the policy, the one or more conditions prompting the network mediator device to generate and transmit a message to the device management server, wherein one of the one or more conditions specifies assigning a high priority to one or more types of status alerts received from the network device that indicate a threshold has been met for one or more configuration parameters of the network device;
      in response to determining, by the network mediator device, that the response satisfies at least one condition of the one or more conditions set forth in the policy that applies to the network device:
         in response to determining, by the network mediator device, that the response does include at least one of the one or more types of status alerts, immediately generating and transmitting a message with high priority to the device management server indicating the one or more types of status alerts received in the response;
         in response to determining, by the network mediator device, that the response does not include any of the one or more types of status alerts, generating a message indicating the response, and transmitting the message, to the device management server, at a scheduled time interval specified in the policy.

2. The network mediator device of claim 1, wherein the network mediator device is configured as a standalone computer server;
   wherein the network mediator device is configured to directly manage the one or more network devices;
   wherein the device management server is configured as a standalone computer server separate from the network mediator device;
   wherein the device management server is configured to indirectly manage the one or more network devices;
   wherein the network mediator device communicates with the device management server through one or more communications firewalls;
   wherein a network device managing system comprises one or more additional network mediators; and
   wherein the one or more network devices comprise one or more of: a multifunction peripheral device, a printer, a scanner, a fax machine, a workstation, a laptop, a personal computer, a personal digital assistant, or a tablet.

3. The network mediator device of claim 1, wherein a first policy, from the one or more policies, comprises one or more of: an identification of a network device, a type of information that is requested from a network device, a type of information that is not to be reported from a network device to the device management server, a time schedule for polling information from a network device, the one or more conditions for processing a response received from a network device, a format type of a message to be sent to the device management server, or a format type of instructions to be sent to a network device; and
   wherein the one or more conditions set forth in the first policy specify one or more of: a type of information to report to the device management server, a timing for reporting information to the device management server, an aggregation scheme for presenting information to the device management server, or a format of reporting messages to be sent to the device management server.

4. The network mediator device of claim 1, wherein the network mediator application is further configured to perform:
   sending an authentication request from the network mediator device to the device management server; and
   upon receiving, from the device management server, a first answer to the authentication request:
      transmitting authentication credentials from the network mediator device to the device management server;
      determining whether a second answer has been received from the device management server; and
      upon receiving the second answer from the device management server:
         parsing the second answer to determine whether the network mediator device is successfully authenticated to the device management server; and
         in response to determining that the network mediator device is successfully authenticated to the device management server, requesting the one or more policies from the device management server.

5. The network mediator device of claim 1, wherein the network mediator application is further configured to perform:

receiving, from the network device, one or more Simple Network Messaging Protocol (SNMP) messages;
wherein the one or more SNMP messages comprise one or more of: a trap message, an alert, a warning, or a status report;
analyzing the one or more SNMP messages to determine whether to report at least one of the one or more SNMP messages to the device management server; and
in response to determining that at least one of the one or more SNMP messages is to be reported to the device management server: generating one or more reporting messages that include at least one of the one or more SNMP messages, and transmitting the one or more reporting messages to the device management server.

6. The network mediator device of claim 1, wherein the network mediator application is further configured to perform:
prior to receiving the one or more policies from the device management server, establishing a first communications connection between the network mediator device and the device management server; and
wherein establishing the first communications connection with the device management server comprises:
generating and transmitting, from the network mediator device to the device management server, a mediator request for establishing the first communications connection;
in response to transmitting the mediator request to the device management server, receiving, from the device management server, a server acknowledgment and a server request for establishing the first communications connection;
in response to receiving the server acknowledgment and the server request from the device management server, generating and transmitting, to the device management server, a mediator acknowledgment to confirm that the first communications connection has been established; and
wherein the first communications connection between the network mediator device and the device management server is a TCP/IP connection.

7. The network mediator device of claim 1, wherein the network mediator application is further configured to perform:
establishing a second communications connection between the network mediator device and the network device.

8. A method comprising:
receiving, at a network mediator, from a device management server, one or more policies for configuring or managing one or more network devices, wherein the network mediator is separate from the device management server and separate from the one or more network devices; and
for each policy of the one or more policies:
determining, by the network mediator, a network device, from the one or more network devices, to which the policy applies;
based on the policy, generating, by the network mediator, one or more instructions for configuring or managing the network device;
transmitting, by the network mediator, the one or more instructions to the network device;
receiving, by the network mediator, from the network device, a response to the one or more instructions;
determining, by the network mediator, whether the response satisfies one or more conditions set forth in the policy, the one or more conditions prompting the network mediator to generate and transmit a message to the device management server, wherein one of the one or more conditions specifies assigning a high priority to one or more types of status alerts received from the network device that indicate a threshold has been met for one or more configuration parameters of the network device;
in response to determining, by the network mediator, that the response satisfies at least one condition of the one or more conditions set forth in the policy that applies to the network device:
in response to determining, by the network mediator, that the response does include at least one of the one or more types of status alerts, immediately generating and transmitting a message with high priority to the device management server indicating the one or more types of status alerts received in the response;
in response to determining, by the network mediator, that the response does not include any of the one or more types of status alerts, generating a message indicating the response, and transmitting the message, to the device management server, at a scheduled time interval specified in the policy.

9. The method of claim 8, the network mediator is configured as a standalone computer server;
wherein the network mediator is configured to directly manage the one or more network devices;
wherein the device management server is configured as a standalone computer server separate from the network mediator;
wherein the device management server is configured to indirectly manage the one or more network devices;
wherein the network mediator communicates with the device management server through one or more communications firewalls; and
wherein the one or more network devices comprise one or more of: a multifunction peripheral device, a printer, a scanner, a fax machine, a workstation, a laptop, a personal computer, a personal digital assistant, or a tablet.

10. The method of claim 8, wherein a first policy, from the one or more policies, comprises one or more of: an identification of a network device, a type of information that is requested from a network device, a type of information that is not to be reported from a network device to the device management server, a time schedule for polling information from a network device, the one or more conditions for processing a response received from a network device, a format type of a message to be sent to the device management server, or a format type of instructions to be sent to a network device; and
wherein the one or more conditions set forth in the first policy specify one or more of: a type of information to report to the device management server, a timing for reporting information to the device management server, an aggregation scheme for presenting information to the device management server, or a format of reporting messages to be sent to the device management server.

11. The method of claim 8, further comprising:
sending an authentication request from the network mediator to the device management server; and
upon receiving, from the device management server, a first answer to the authentication request:

transmitting authentication credentials from the network mediator to the device management server;
determining whether a second answer has been received from the device management server;
upon receiving the second answer from the device management server:
parsing the second answer to determine whether the network mediator is successfully authenticated to the device management server; and
in response to determining that the network mediator is successfully authenticated to the device management server, requesting the one or more policies from the device management server.

12. The method of claim 8, further comprising:
receiving, from the network device, one or more Simple Network Messaging Protocol (SNMP) messages;
wherein the one or more SNMP messages comprise one or more of: a trap message, an alert, a warning, or a status report; and
analyzing the one or more SNMP messages to determine whether to report at least one of the one or more SNMP messages to the device management server; and
in response to determining that at least one of the one or more SNMP messages is to be reported to the device management server: generating one or more reporting messages that include at least one of the one or more SNMP messages, and transmitting the one or more reporting messages to the device management server.

13. The method of claim 8, further comprising:
prior to receiving the one or more policies from the device management server, establishing a first communications connection between the network mediator and the device management server; and
wherein establishing the first communications connection with the device management server comprises:
generating and transmitting, from the network mediator to the device management server, a mediator request for establishing the first communications connection;
in response to transmitting the mediator request to the device management server, receiving, from the device management server, a server acknowledgment and a server request for establishing the first communications connection; and
in response to receiving the server acknowledgment and the server request from the device management server, generating and transmitting, to the device management server, a mediator acknowledgment to confirm that the first communications connection has been established; and
wherein the first communications connection between the network mediator and the device management server is a TCP/IP connection.

14. The method of claim 8, further comprising:
establishing a second communications connection between the network mediator and the network device.

15. One or more non-transitory computer-readable storage media storing one or more computer instructions which, when executed by one or more processors, cause the one or more processors to perform:
receiving, at a network mediator, from a device management server, one or more policies for configuring or managing one or more network devices, wherein the network mediator is separate from the device management server and separate from the one or more network devices; and
for each policy of the one or more policies:
determining, by the network mediator, a network device, from the one or more network devices, to which the policy applies;
based on the policy, generating, by the network mediator, one or more instructions for configuring or managing the network device;
transmitting, by the network mediator, the one or more instructions to the network device;
receiving, by the network mediator, from the network device, a response to the one or more instructions;
determining, by the network mediator, whether the response satisfies one or more conditions set forth in the policy, the one or more conditions prompting the network mediator device to generate and transmit a message to the device management server, wherein one of the one or more conditions specifies assigning a high priority to one or more types of status alerts received from the network device that indicate a threshold has been met for one or more configuration parameters of the network device;
in response to determining, by the network mediator, that the response satisfies at least one condition of the one or more conditions set forth in the policy that applies to the network device:
in response to determining, by the network mediator, that the response does include at least one of the one or more types of status alerts, immediately generating and transmitting a message with high priority to the device management server indicating the one or more types of status alerts received in the response;
in response to determining, by the network mediator, that the response does not include any of the one or more types of status alerts, generating a message indicating the response, and transmitting the message, to the device management server, at a scheduled time interval specified in the policy.

16. The one or more non-transitory computer-readable storage media of claim 15, wherein the network mediator is configured as a standalone computer server;
wherein the network mediator is configured to directly manage the one or more network devices;
wherein the device management server is configured as a standalone computer server separate from the network mediator;
wherein the device management server is configured to indirectly manage the one or more network devices;
wherein the network mediator communicates with the device management server through one or more communications firewalls; and
wherein the one or more network devices comprise one or more of: a multifunction peripheral device, a printer, a scanner, a fax machine, a workstation, a laptop, a personal computer, a personal digital assistant, or a tablet.

17. The one or more non-transitory computer-readable storage media of claim 15, wherein a first policy, from the one or more policies, comprises one or more of: an identification of a network device, a type of information that is requested from a network device, a type of information that is not to be reported from a network device to the device management server, a time schedule for polling information from a network device, the one or more conditions for processing a response received from a network device, a format type of a message to be sent to the device management server, or a format type of instructions to be sent to a network device; and wherein the one or more conditions set forth in the first policy specify one or more of: a type of information to report to the device management server, a timing for reporting information to the device management server, an aggregation scheme for presenting information to the device management server, or a format of reporting messages to be sent to the device management server.

18. The one or more non-transitory computer-readable storage media of claim 15, storing additional computer instructions which, when executed by the one or more processors, cause the one or more processors to perform:

sending an authentication request from the network mediator to the device management server; and upon receiving, from the device management server, a first answer to the authentication request:

transmitting authentication credentials from the network mediator to the device management server;

determining whether a second answer has been received from the device management server; and upon receiving the second answer from the device management server:

parsing the second answer to determine whether the network mediator is successfully authenticated to the device management server; and in response to determining that the network mediator is successfully authenticated to the device management server, requesting the one or more policies from the device management server.

19. The one or more non-transitory computer-readable storage media of claim 15, storing additional computer instructions which, when executed by the one or more processors, cause the one or more processors to perform:

receiving, from the network device, one or more Simple Network Messaging Protocol (SNMP) messages;

wherein the one or more SNMP messages comprise one or more of: a trap message, an alert, a warning, or a status report;

analyzing the one or more SNMP messages to determine whether to report at least one of the one or more SNMP messages to the device management server; and in response to determining that at least one of the one or more SNMP messages is to be reported to the device management server: generating one or more reporting messages that include at least one of the one or more SNMP messages, and transmitting the one or more reporting messages to the device management server.

20. The one or more non-transitory computer-readable storage media of claim 15, storing additional computer instructions which, when executed by the one or more processors, cause the one or more processors to perform:

prior to receiving the one or more policies from the device management server, establishing a first communications connection between the network mediator and the device management server; and wherein establishing the first communications connection with the device management server comprises:

generating and transmitting, from the network mediator to the device management server, a mediator request for establishing the first communications connection;

in response to transmitting the mediator request to the device management server, receiving, from the device management server, a server acknowledgment and a server request for establishing the first communications connection;

in response to receiving the server acknowledgment and the server request from the device management server, generating and transmitting, to the device management server, a mediator acknowledgment to confirm that the first communications connection has been established; and wherein the first communications connection between the network mediator and the device management server is a TCP/IP connection.

* * * * *